United States Patent [19]

MacLeay

[11] 4,228,069
[45] Oct. 14, 1980

[54] AZOXY COMPOUND HAVING USE IN A PROCESS FOR PREPARING FOAMED STRUCTURES

[75] Inventor: Ronald E. MacLeay, Amherst, N.Y.

[73] Assignee: Pennwalt Corporation, Philadelphia, Pa.

[21] Appl. No.: 22,743

[22] Filed: Mar. 22, 1979

[51] Int. Cl.³ .................... C07C 107/02; C08J 9/00
[52] U.S. Cl. ............................. 260/143; 521/95; 260/192
[58] Field of Search ............... 260/143, 192, 152, 156

[56] References Cited

U.S. PATENT DOCUMENTS

| | | | |
|---|---|---|---|
| 3,957,750 | 5/1976 | Macleay et al. | 260/174 |
| 3,993,609 | 1/1977 | Kamens et al. | 260/192 X |
| 4,007,165 | 2/1977 | Macleay et al. | 260/192 |
| 4,025,502 | 3/1977 | Macleay et al. | 260/192 |
| 4,075,286 | 2/1978 | Macleay et al. | 260/192 X |

Primary Examiner—Floyd D. Higel

[57] ABSTRACT

An acid sensitive, mono- or di- azoxy compound is reacted with an acidulous acidic polymerizable medium to form a cellular polymeric structure. An unsymmetrical azoxy compound is also provided having the formula

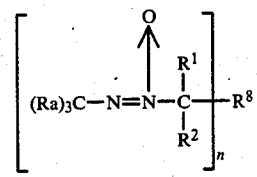

where n is 1 or 2 and $R^8$ is movalent when n is 1 and divalent when n is 2.

4 Claims, No Drawings

AZOXY COMPOUND HAVING USE IN A PROCESS FOR PREPARING FOAMED STRUCTURES

BACKGROUND OF THE INVENTION

This invention comprehends the foaming of unsaturated polyesters using acid sensitive azoxy compounds. It also relates to a mono- or di-, unsymmetrical azoxy compound.

Prior to the present invention, polyester resins were foamed using complex mixtures of components in aqueous systems. Many of the prior art references relate to a sequential operation in which gas is first released in the polymerizable cross-linkable resinous medium followed by an attempt to effect the polymerization/crosslinking without destroying the foam. The foaming operation and the polymerization/crosslinking operation had to be correlated in order to obtain any successful results; such operations are difficult and have been found to be entirely impractical. Another prior art attempt to producing foam is by simultaneously initiating the polymerization/crosslinking and releasing of the gas into the resinous medium. This, too, has proved to be entirely impractical because the polymerization/crosslinking reaction takes place so quickly that the resinous medium becomes too highly viscous or even rigid at such an early stage that the resin cannot be foamed. In the case where the operations were performed sequentially, the foam was a transitory nature, i.e., foam would dissapate, to the extent that the gas would be released to the atmosphere, before polymerization/crosslinking could be effected.

U.S. Pat. No. 3,993,609 describes a process similar to the process of this invention for foaming a polymerizable medium by employing acid sensitive azo compounds in acidulous media. A considerable number of these azo compounds, however, are thermally unstable and require refrigeration. In contrast thereto, the corresponding azoxy compounds are much more thermally stable and can be stored and shipped at room temperature or above which make them economically more feasible.

SUMMARY OF THE INVENTION

This invention is directed to an azoxy compound having the formula

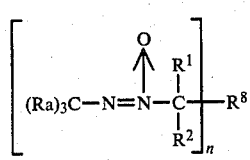

wherein
(a) n is 1 or 2
(b) $R^1$ is selected from alkyl of 1 to 6 carbons or cycloalkyl of 3 to 12 carbons;
(c) $R^2$ is selected from $R^1$ and aryl of 6 to 10 carbons;
(d) $R^1$ and $R^2$ can be joined to form an alkylene diradical of 3 to 11 carbons;
(e) $(R_a)_3$ C— is selected from tertiary-alkyl of 4 to 8 carbons, tertiary cycloalkyl of 6 to 11 carbons or tertiary aralkyl of 9 to 12 carbons;
(f) when n is 1, $R^8$ is selected from

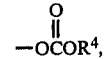

—CN, —OAc or —$OR^4$ where $R^4$ is methyl, ethyl, propyl, isopropyl, or phenyl;
(g) when n is 2, $R^8$ is selected from

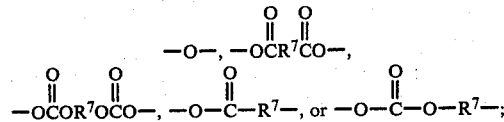

(h) $R^7$ is a divalent radical selected from alkylene of 1 to 10 carbons, cycloalkylene of 3 to 6 carbons or phenylene.

This invention is also directed to a process for preparing cellular polymeric structures which comprises mixing an acidulous or acidic polymerizable medium that is polymerizable and/or crosslinkable by a free radical mechanism with an effective amount of an acid sensitive mono- or di-azoxy compound selected from

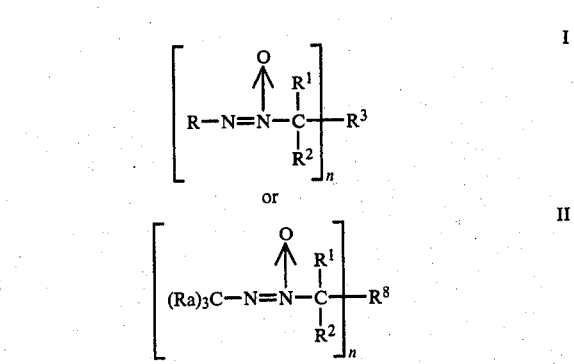

wherein
(a) n is 1 or 2
(b) R is selected from alkyl of 1 to 10 carbons, cycloalkyl of 3 to 11 carbons, aryl of 6 to 10 carbons or

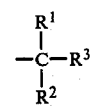

where $R^3$ is selected from $R^2$, —CN, —OAc,

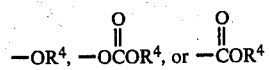

(c) $R^1$ is selected from alkyl of 1 to 6 carbons or cycloalkyl of 3 to 12 carbons;
(d) $R^2$ is selected from $R^1$ and aryl of 6 to 10 carbons;
(e) $R^1$ and $R^2$ can be joined to form an alkylene diradical of 3 to 11 carbons;
(f) when n is 1, $R^3$ is selected from

—CN, —OAc or —$OR^4$;
(g) $R^4$ is methyl, ethyl, propyl, isopropyl or phenyl;
(h) when n is 2, $R^3$ is selected from

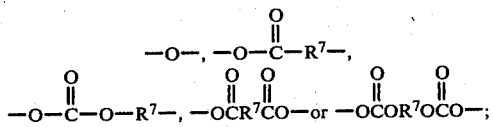

(i) $R^7$ is a divalent radical selected from alkylene of 1 to 10 carbons, cycloalkylene of 3 to 6 carbons or phenylene;

(j) $(Ra)_3C—$ is selected from tertiary-alkyl of 4 to 8 carbons, tertiary cycloalkyl of 6 to 11 carbons or tertiary aralkyl of 9 to 12 carbons;

(k) when n is 1, $R^8$ is selected from

—CN, —OAc or —$OR^4$; and (l) when n is 2, $R^8$ is selected from

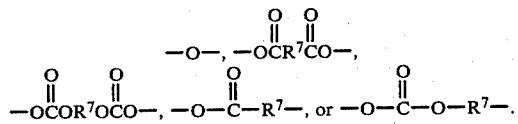

DETAILED DESCRIPTION OF THE INVENTION

In Formula I $R^1$ is a substituted or non-substituted hydrocarbon radical containing 1 to 12 carbon atoms, such as alkyl of 1 to 6 carbons, cycloalkyl of 3 to 12 carbons. $R^2$ is the same as $R^1$ except $R^2$ may also be a substituted or nonsubstituted aryl radical of 6 to 10 carbons and $R^1$ and $R^2$ may form an alkylene diradical of 3 to 11 carbons. $R^3$ includes all the $R^2$ radicals. $R^3$ may also be cyano, or a group having an oxygen atom linked to the carbon atom shown in Formula I (such as ester, ether or carbonate groups). When the acid sensitive compound is a monoazoxy compound, it includes $R^3$ wherein the ester may be

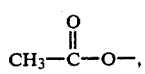

the ether may be $R^4—O—$, and the carbonate may be

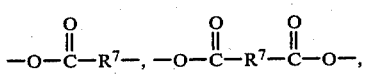

When the acid sensitive compound is a diazoxy compound, $R^3$ may be a divalent radical that serves to join two groups of formula I. Specific examples of divalent $R^3$ include those wherein the ester may be

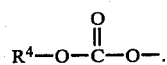

the ether may be —O—, and the carbonate may be

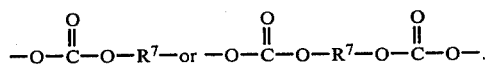

$R^4$ is methyl, ethyl, propyl, isopropyl or phenyl.

$R^7$ is a non-substituted or monosubstituted divalent hydrocarbon radical of 1 to 10 carbon atoms, such as alkylene of 1-10 carbons (preferably 1-4), cycloalkylene of 3-6 carbons (preferably 6), or phenylene.

R is selected from alkyl of 1 to 10 carbons, cycloalkyl of 3 to 11 carbons, aryl of 6 to 10 carbons or

where $R^3$ is selected from $R^2$, —CN, —OAc, —$OR^4$,

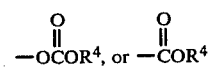

In Formula II where n is 1 or 2, $(Ra)_3C—$ is a tertiary-alkyl group of 4 to 8 carbons, tertiary cycloalkyl of 6 to 11 carbons or tertiary aralkyl of 9 to 12 carbons and Ra is a lower alkyl radical of 1 to 4 carbons, a cycloalkyl radical of 3 to 6 carbons or an aryl radical of 6 to 9 carbons, preferably phenyl or tolyl and not more than one Ra may be an aryl radical. In addition, the Ra groups may be joined together to form a cyclo, bicyclo or tricyclo radical of 3 to 11 carbons, preferably a cycloalkyl radical of 5 to 8 carbons or a tricycloalkyl radical of 7 to 10 carbons.

$R^1$ and $R^3$ are as previously defined. $R^8$ is the same as $R^3$ except $R^8$ does not include the $R^2$ radicals. $R^8$ may be monovalent or divalent.

Examples of $R^1$ radicals are: methyl, ethyl, propyl, butyl, i-butyl, sec.-butyl, tert.-butyl, cyclopropyl, cyclobutyl, cyclopentyl, cyclohexyl, cyclooctyl, and cyclododecyl.

Examples of $R^2$ radicals include those radicals mentioned for $R^1$ above, phenyl, naphthyl, methylphenyl, triethylphenyl, and cyclopropylphenyl.

Examples of $R^3$ radicals include those radicals mentioned for $R^1$ and $R^2$ above, cyano, and the following groups when $R^3$ is monovalent:

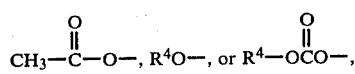

or when $R^3$ is divalent

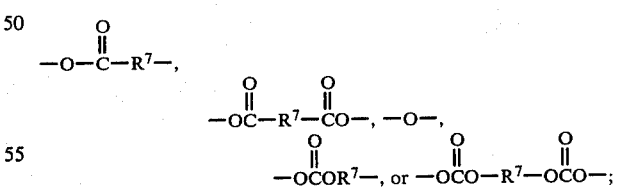

where $R^4$ is methyl, ethyl, propyl, isopropyl or phenyl; $R^7$ maybe methylene, ethylene, tetramethylene, decamethylene, propylidene, p-phenylene, cyclohexylene, cyclopentylene, and 2-butenylene.

Specific Examples of $R^3$ radicals are: acetoxy, methoxy, ethoxy, isopropoxy, propoxy, phenoxy, oxygen, methoxycarbonyloxy, ethoxycarbonyloxy, isopropoxycarbonyloxy, propoxycarbonyloxy, and ethylenedi(oxycarbonyloxy).

Examples of R radicals are: methyl, ethyl, propyl, i-propyl, butyl, i-butyl, sec-butyl, tert-butyl, tert-amyl, tert-hexyl, tert-octyl, cyclopropyl, cyclobutyl, cyclopentyl, 1-methylcyclopentyl, cyclohexyl, 1-methylcyclohexyl, cyclooctyl, cyclodedocyl, adamantyl, bicyclo[2.2.1]heptyl, alpha-cumyl, phenyl, naphthyl, toluyl, xylyl, 2-cyano-2-propyl, 2-cyano-2-butyl, 1-cyanocyclohexyl, 1-cyanocyclopentyl, 2-phenyl-2-propyl, 2-phenyl-2-butyl, 2methoxy-2-propyl, 2-methoxy-2-butyl, 1-methoxycyclohexyl, 1-methoxycyclopentyl, 1-methoxycyclooctyl, 2-ethoxy-2-propyl, 2-i-propoxy-2-butyl, 1-ethoxycyclobutyl, 1-ethoxycycloheptyl, 1-i-propoxycyclohexyl, 2-(methoxycarbonyloxy)-2-butyl, 1-(ethoxycarbonyloxy)cyclohexyl, and 1-(isopropoxycarbonyloxy) cyclopentyl.

Examples of $R^8$ radicals include all those radicals mentioned for $R^3$ with the exception of the $R^1$ and $R^2$ radicals.

Examples of $R^1$ and $R^2$ linked together are: trimethylene, pentamethylene, heptamethylene, decamethylene, tetramethylene, 1,1,3,3-tetramethylpropylene, undecamethylene, and 1,2 or 3-methylpentamethylene.

Examples of $(R^a)_3C-$ radicals are: tert-butyl, tert-amyl, tert-cumyl, tert-adamantyl, tert-(2-methyl)bicyclo[2.2.1]heptyl, tert-(2-methyl)bicyclo[2.2.2]octyl, tert-octyl, tert-(alpha-methyl-alpha-ethyl)benzyl, tert-(alpha,alpha-diethyl) benzyl.

Examples of $R^a$ radicals are: methyl, ethyl, propyl, isopropyl, butyl, isobutyl, sec-butyl, tert-butyl, cyclopropyl, cyclobutyl, cyclopentyl, cyclohexyl, phenyl, orthometa-and para-toluyl.

The following examples are Formula II novel azoxy compounds:

N-t-butyl-N'-(1-cyclopropyl-1-ethoxy)ethyldiazine N'-oxide
N-t-cumyl-N'-(1-cyclododecyl-1-propoxy)propyldiazine N'-oxide
N-t-butyl-N'-(1-acetoxy-1-phenyl)ethyldiazine N'-oxide
N-t-butyl-N'-1-acetoxycyclobutyldiazine N'-oxide
N-t-heptyl-N'-1-propoxycyclododecyldiazine N'-oxide
N-t-butyl-N'-1-ethoxycyclohexyldiazine N'-oxide
N-t-1-methylcyclohexyl-N'-[1-acetoxy-1-(3-chlorophenyl)]-ethyldiazine N'-oxide
N-t-1-methylcyclopentyl-N'-(1-acetoxy-1-naphth-1-yl)-ethyldiazine N'-oxide
N-t-adamantyl-N'-(1-methoxy-1-methyl)ethyldiazine N'-oxide
N-t-1-ethylcyclohexyl-N'-(1-isopropoxy-1,3,-dimethyl-3-phenyl)-butyldiazine N'-oxide
N-t-butyl-N'-1-phenoxycyclohexyldiazine N'-oxide
N-t-butyl-N'-(1-ethoxycarbonyloxy-1-methyl)butyldiazine N'-oxide
N-t-cumyl-N'-(1-isopropoxycarbonyloxy-1-ethyl)-propyldiazine N'-oxide
N-t-butyl-N'-[1-phenoxycarbonyloxy)-1-(para-methoxyphenyl)]-ethyldiazine N'-oxide
di-[(1-t-butylazoxy-1-methyl)ethylmalonate]
di-[(1-t-butylazoxy-1-methyl)ethylsuccinate]
di-[(1-t-amylazoxy-1-methyl)propyldecanedicarboxylate]
di-[(1-t-butylazoxy-1-methyl)ethyl 1,2-cyclopropanedicarboxylate]
di-[(1-t-butylazoxy-1-methyl)propyl 1,4-cyclohexanedicarboxylate]
di-[(1-t-butylazoxy-1-methyl)ethyl]terphthalate
1-t-butylazoxy-1-methylethyl 4-t-butylazoxy-4-methylvalerate
1-t-butylazoxy-1-methylethyl 4-[(1-t-butylazoxy-1-methyl)ethyl]benzoate
di-[(1-t-butylazoxy-1-methyl)ethyl]ether
di-[(1-t-butylazoxy-1-methyl)ethyl]ethylene glycol dicarbonate
di-[(1-t-butylazoxy-1-methyl)ethyl]1,4-butylene glycol dicarbonate
di-[(1-t-butylazoxy-1-methyl)ethyl]para-phenyleneglycol dicarbonate
N-t-1-methylcyclohexyl-N'-(1-acetoxy-1-cyclopropyl-)ethyldiazine N'-oxide
N-t-adamantyl-N'-(1-acetoxy-1-methyl)ethyldiazine N'-oxide
N-t-octyl-N'-(1-acetoxy-1-methyl)ethyldiazine N'-oxide
N-1,1-dimethyl-2-phenylethyl-N'-(1-methoxy-1-methyl)-ethyldiazine N'-oxide
N-(1,1-dimethyl-4-phenyl)butyl-N'-(1-acetoxy-1-methyl)-ethyldiazine N'-oxide
N-t-cumyl-N'-(1-methoxy-1-methyl)ethyldiazine N'-oxide
N-(1-methyl-1-anthr-2-yl)ethyl-N'-(1-acetoxy-1-methyl)-ethyldiazine N'-oxide
N-t-1-methylcyclopentyl-N'-1-methoxycyclopentyldiazine N'-oxide
N-t-adamantyl-N'-(1-cyano-1-methyl)ethyldiazine N'-oxide
N-2-methylnorborn-2-yl-N'-(1-acetoxy-1-methyl)ethyldiazine N'-oxide
2,9-di-t-butylazoxy-2,9-dimethyl-3,5-dioxa-4-oxodecane
N-t-alpha,alpha-diethylbenzyl-N'-(1-methoxy)cyclobutyldiazene N'-oxide The following examples are Formula I compounds useful as foaming agents for polyester resins and other polymerizable media:

N,N'-di-[(1-methoxy-1-methyl)ethyl]diazine N'-oxide
N,N'-di-t-butyldiazine N'-oxide
N,N'-di-[(1-acetoxy-1-methyl)propyl]diazine N'-oxide
N,N'-di-[(1-acetoxy-1-methyl)ethyl]diazine N'-oxide
N,N'-di-[(1-cyano-1-methyl)ethyl]diazine N'-oxide
N,N'-di-[(1-cyano-1,3-dimethyl)butyl]diazine N'-oxide
N,N'-di-[(1-methyl-1-cyclohexyl)ethyl]diazine N'-oxide
N,N'-di-[(1-methyl-1-phenoxy)ethyl]diazine N'-oxide
N,N'-di-[(1-methoxycarbonyloxy-1-methyl)propyl]diazine N'-oxide
N-(1-methoxy-1-methyl)ethyl-N'-(1-acetoxy-1-phenyl-)ethyldiazine N'-oxide
N-(1-methoxy-1-methyl)ethyl-N'-(1-cyano)cyclohexyldiazine N'-oxide
N-1-cyanocyclohexyl-N'-(1-methoxycarbonyloxy-1-phenyl)ethyldiazine N'-oxide
N-methyl-N'-(1-ethoxycarbonyloxy-1-methyl)ethyldiazine N'-oxide
N-cyclopropyl-N'-(1-acetoxy-1-methyl)ethyldiazine N'-oxide
N-cyclohexyl-N'-(1-methoxy-1-methyl)ethyldiazine N'-oxide
N-phenyl-N'-(1-acetoxy-1-methyl)ethyldiazine N'-oxide
N-t-butyl-N'-(1-methyl-1-cyclohexyl)ethyldiazine N'-oxide The azoxy compounds of Formula I may be activated to decompose and generate gaseous products at room temperature or below in the polymerizable media of this invention to provide foamed polymeric structures. The mixture of resin media and azoxy compound is shaped while the azoxy compound reacts with the resin media (a) to blow it by gas generation and (b) to initiate polymerization of at least one component of the media to provide a partially polymerized or partially crosslinked matrix, i.e. a matrix having fluidity characteristics such that the gases generated are retained in the matrix, thereby to define a stable foam. The gas bubbles, dispersed through the gelled matrix, produce either a "closed" or "open" cellular configuration depending upon the amount and rate of evolution of the gas and the fluidity and strength characteristics of the resin media during the period of gas generation. After shaping, the cellular structure can be cured. Depending upon the nature of the polymerizable media involved, such curing can involve crosslinking and/or further polymerization. The use of an added curing agent (i.e. in addition to the acid sensitive azoxy foaming agent hereof) is optional; in some formulations it will improve the physical properties of the foamed structures hereof. A wide variety of conventional peroxy and azo curing agents can be used to enhance the cure reaction; e.g., t-butyl perbenzoate (0.01 to 1.0%) is very effective in enhancing the cure reaction in foamed polyesters. The added curing agent is usually included as a component of the polymerizable media and is generally activated at a temperature above that at which the gas evolution occurs.

The nature of the polymerizable medium is not critical provided (a) that it is sufficiently acidic to decompose the acid sensitive azoxy compound hereof necessary to effect the desired evolution of gas and (b) at least one component of the media is polymerizable or crosslinkable by free radical initiation, i.e. the component is a resin polymerizable or crosslinkable by free radical initiation ("reactive resin") or is a vinyl or vinyldene monomer. Thus the media may be any of the following systems:

1. A reactive polymeric resin, or mixture of reactive polymeric resin (or resins) with an unreactive resin or resins.
2. Reactive resin(s) and/or unreactive resin(s) dissolved and/or dispersed in a polymerizable monomer or mixture of monomers.
3. A reactive resin or mixture of resins, at least one being reactive, dissolved or dispersed in an inert solvent or diluent.
4. A monomer or mixture of monomers.
5. Combination of any or all of the above.

A wide variety of inert liquid diluents may be added to any of the above described polymerizable media to give appropriate viscosity, physical properties and/or cost. Many of the physical properties of the resultant foams will depend on the nature of the polymerizable media in a manner well understood by those skilled in the art.

Sufficient acidity of the resin media is essential to activate the azoxy compound. The strength and amount of acidity required in any particular system is largely a function of the nature of the azoxy compound. The azoxy compounds are readily activated by strong acids or acyl-alkyl-sulfonyl peroxides. The cure of the polyester foam can be enhanced by the addition of a conventional curing agent such as a peroxide or azo compound.

The amount of acid sensitive azoxy compound to be added to a particular resin medium will depend upon the effect desired, the chemical identity of the azoxy compound, the resin, and the extraneous acid or other activator (if used) and the temperature. Obviously, a lesser amount of a particular azoxy compound will produce, in an otherwise identical system under the same conditions, a higher density product than a relatively larger amount. Whether the cells will be closed or open will depend both on the amount of azoxy used, the strength characteristics of the resin during the expansion process, and the like. These are variables within the skill of technicians versed in the art of blowing plastics. Usually the use of sufficient azoxy to provide from 0.5 to 4 weight percent based on total reactant is sufficient to form closed cell structures. As little as 0.2 weight percentage will often produce observable foaming. As much as 15 weight percentage of azoxy has been found useful in some systems. Generally, use of from about 0.2 to 8 weight percentage of azoxy compound is preferred.

Any conventional mixing method can be used to distribute the azoxy compound throughout the resin media, and any high speed paddle mixer is suitable. Mixing nozzles for combining the two liquids may also be employed. The order of addition of the reactants is not critical and may be varied for particular purposes. However, it is usually preferable that the resin media contains whatever acid is necessary and whatever curing agent is desired prior to the incorporation of the azoxy compound. The azoxy compound can be mixed with monomer such as styrene and the latter mixture added to the acidulated resin to facilitate processing.

The temperature at which the azoxy compound is mixed with the resin media is usually not important provided it is low enough to avoid rapid premature polymerization of the resin media. Operative temperatures depend upon the nature of the azoxy compound and the resin. Generally, the reaction will occur at room temperatures, and the speed of reaction at such temperatures will usually be suitable. The use of lower or higher temperatures may be preferred in order to improve control of the reaction.

U.S. Pat. No. 3,993,609 describes methods of shaping or molding the cellular structures using acid-sensitive azo compounds. These methods are also applicable to the acid-sensitive azoxy foaming system. U.S. Pat. No. 3,993,609 also describes curing agents, surfactants, auxiliary blowing agents, fillers, diluents, activating agents and nucleating agents which are also applicable for the acid-sensitive azoxy foaming system.

Densities of about 25 lb. per cubic foot in the final cellular structure are generally suitable as synthetic wood for uses such as picture frames or plaques while densities of about 35 lb. per cubic foot are appropriate for molded components for structural purposes, such as furniture parts for which wood is normally used. Insulation, flotation articles, packaging and energy absorption materials, may have densities of about 2 lb. per cubic foot. Closed cell structures would be utilized where water resistance is desired while open cell configurations would be adopted for use as sponges, for example.

While the well-known azo blowing agents, such as azodicarbonamide, decompose into gaseous products upon heating, they do not act concurrently as a polymerization initiator, and the incorporation of a separate initiator is required to support the foam. Addition of a separate gelling agent presents the problem of coordinating the polymerization of the resin with the release of the gas from the blowing agent. Furthermore, azodicarbonamide as a blowing agent requires too high a temperature for use with polyesters. In the case of normal azo initiators, such as azo nitriles, the curing of the polyester system develops so rapidly that the gas released does not have any opportunity to expand. In the case of the acid-sensitive azo compounds of U.S. Pat. No. 3,993,609, the better foaming agents are thermally unstable and require cold temperature storage and shipment.

In the process of the present invention, the azoxy compounds react with the resin media in a fortuitously coordinated manner to both release gaseous products and initiate polymerization and/or crosslinking of the resin media. Thus, the azoxy compounds are activated by the acidic resin media to gel the resin while the gas is liberated. In view of the coordinated reactions the resin media expands while resin gelling occurs, forming the cell structure.

The present invention is especially useful in the preparation of foamed polyester resins, both rigid and flexible. Cellular structures formed from polyesters are relatively strong and inexpensive, generally resistant to heat and chemicals and exhibit good light stability and minimal moisture pickup. Cellular polyester structures are not commercially available due to the difficulty discussed above, i.e. coordination of gas generation and resin solidification. The present invention presents a simple and effective answer to that problem.

A polyester resin media which is most suitably adopted for making cellular structures is a system containing an unsaturated polyester resin and a copolymerizable monomer to form a viscous syrup. By "unsaturated polyester resin" is meant a resin the molecules of which contain at least two ester groups and at least one ethylenically unsaturated bond through which interpolymerization may occur. The unsaturated polyesters are polyesters obtained by esterifying ethylenically unsaturated di- or polycarboxylic acids, their anhydrides or their halides with saturated or unsaturated polyols. Mixtures of polyacids and/or polyalcohols may also be used. The unsaturated di- or polycarboxylic acids may be replaced, at least partly, by polycarboxylic acids containing no ethylenic unsaturation. The latter acids are particularly useful in preparing flexible type foams. Diminishing the amount of unsaturated component reduces the degree of crosslinking which can occur and may yield a more flexible cellular product after curing.

Other resins useful in preparing the shaped cellular (foamed) structures of the present invention include those resins which are terminated by polymerizable unsaturated ester functions but wherein the polymer repeating units may or may not be of the polyester type, for example, polyethers terminated with acrylic acid ester groups. Such resins, when blended with suitable copolymerizable monomers, may be cured to hard thermosets by means of free radical curing agents. A typical series of such resins are commercially available from Dow Chemical Corporation under the trademark "Derakane" resins and generally comprise polyether polymers prepared from an epoxide (e.g. glycidol) and a bisphenol (e.g. s, 2-di(4-hydroxyphenyl) propane or bisphenol A) which are terminated by acrylic acid ester functions and blended with styrene.

Preferred among copolymerizable monomers are ethylenically unsaturated monomers such as styrene, vinyl toluene, methyl methacrylate, diallyl phthalate, dibutyl fumarate, acrylonitrile, triallyl cyanurate, alpha-methyl styrene, divinyl benzene, methyl acrylate, diallyl maleate, n-butyl methacrylate and ethyl acrylate. The ratio of polyester to monomer or monomer mixture may vary over a wide range, i.e., between about 0.2:1 to 4:1 is suitable.

A preferred resin media contains the esterification products of propylene glycol with maleic anhydride and phthalic anhydride in admixture with styrene as a monomer component. That resin is referred to hereinafter as the Standard Unsaturated Polyester Resin (see Example XIII).

At times, it is advantageous to increase the flowability of the resin media by addition of an unreactive diluent or solvent. It has also been found useful to add surfactants to the resin media to promote uniformity of cell size in the final product. Such additives are particularly valuable in systems employing a relatively high concentration of azoxy compound to initiate polymerization and blow the media. Such surfactants may be of the cationic (quarternary salts), anionic (sulfonates and sulfates) and non-ionic (ethylene oxide condensates) type. Some suitable surfactants include such materials as: metallic soaps, alkylene oxide-phenol addition products, alkyl aryl sulfates and sulfonates, dimethyl siloxane polymers, and cationic siloxanes of the general formula shown in U.S. Pat. No. 3,642,670. Air will also serve as a nucleating agent. Only a small amount well dispersed as small bubbles throughout the resin is needed (as distinguished from the case where one attempts to foam the resin by beating air into it). It is sufficient to mix the resin medium with the acid sensitive azoxy compound hereof (and other components hereof as desired) in the presence of air. In the experiments hereof carried out in paper cups and the like, this was accomplished simply by mixing with an electric stirrer. When one uses molding equipment involving pumped stream(s) and a mixing head, one simply bleeds some air to the mixing head.

POLYMERIZABLE MEDIA

A wide variety of polymerizable media are useful for this invention. They must possess sufficient acidity to provide gas for foaming (resulting from decomposition of a portion of the acid sensitive azoxy compound used). The polymerizable media must otherwise be capable of polymerizing and/or crosslinking in the presence of a free radical initiator, all or part of such initiation being provided by the acid sensitive azoxy compounds hereof. In the case of polymers containing acid groups as integral parts of the polymer molecule, the acidity may be sufficient to effect the required gas evolution from certain of the acid sensitive azoxys hereof. With certain other acid sensitive azoxys, it may be necessary to augment the acidity of the polymerizable media. In the case of polymers containing no acid function, addition of acid is necessary. A further description of the polymerizable media applicable to this invention is found in U.S. Pat. No. 3,993,609.

TABLE A

| Parameter | Utilization Ranges* for Foaming Polymerizable Media | | |
|---|---|---|---|
| | Overall Range | Operating Range | Preferred Range |
| Acid Sensitive Azoxy Compounds | 0.02 to 15 wt % | 0.2 to 8 wt % | 0.5 to 4 wt % |
| Foaming Activators | 0.1 to 99.9 wt % | 0.2 to 10 wt % | 0.5 to 6 wt % |
| Added Curing Agents | 0.0 to 10 wt % | 0.05 to 5 wt % | 0.1 to 2 wt % |
| Vaporizable Adjuvents | 0.0 to 20 wt % | 0.0 to 10 wt % | 0.0 to 4 wt % |
| Surfactants And | 0.1 to 5 wt % | 0.25 to 2 wt % | 0.5 to 15 wt % |

TABLE A-continued

| Parameter | Utilization Ranges* for Foaming Polymerizable Media | | |
|---|---|---|---|
| | Overall Range | Operating Range | Preferred Range |
| The Like Adjuvents Having Low Density | 1 to 30 wt % | 5 to 25 wt % | 15 to 20 wt % |
| Fillers | 0.1 to 60 wt % | 0.5 to 30 wt % | 2 to 10 wt % |
| Temperatures | −20 to 150° C. | 15 to 60° C. | 21 to 32° C. |
| | −4 to 302° F. | 59 to 140° F. | 70 to 90° F. |

*Percentages are based on weight of Polymerizable Medium

METHODS OF PREPARATION OF THE AZOXY FOAMING AGENTS

The azoxy compounds of this invention are prepared by oxidizing the corresponding azo compound with a peracid. It was found that a 25% solution of peracetic acid in ethyl acetate was a convenient reagent for oxidizing the azo compound to the azoxy compound. The preparations of most of the azo compounds used as starting materials are described in U.S. Pat. No. 3,993,609 or the references cited therein.

When $R^3$ is an acetoxy group the azoxy compounds can be prepared by reacting the corresponding ketone monoalkylhydrazone with an excess of peracetic acid. [B. T. Gillis and K. F. Schimmel, J. Org. Chem. 32, 2865 (1967)]

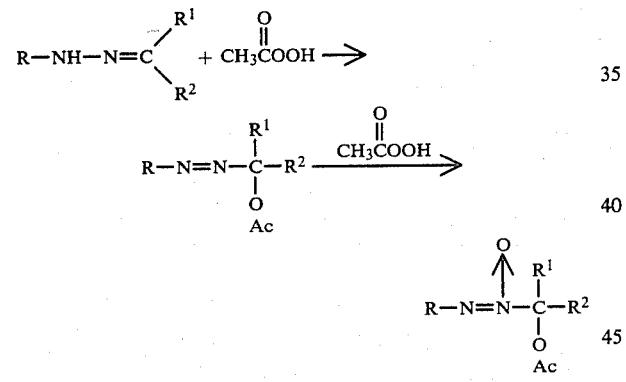

Azoxy compounds of this invention may also be prepared by reacting an N-alkylhydroxylamine with a t-alkyl nitroso compound e.g.

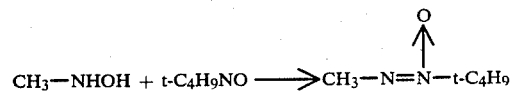

[W. D. Emmons, J. Am. Chem. Soc. 79, 6522 (1957)]

Azoxy compounds of this invention may also be prepared from t-nitroso compounds and N,N-dichloroamines in the presence of methanolic KOH

J. Org. Chem. 39 2967 (1974) [F. Sullivan, E. Luck and P. Kovacic, J.C.S. Chem. Comm. 1974 p 217]

EXPERIMENTAL PREPARATION OF AZOXY FOAMING AGENTS

EXAMPLE I 1-t-Butylazoxy-1-acetoxycyclohexane

[N-t-butyl-N'-(1-acetoxycyclohexyl)diazine N'-oxide]

To 50 ml. of a 25% solution of peracetic acid in ethyl acetate in a 100 ml. 3-neck round bottom flask equipped with a magnetic stirrer, thermometer and addition funnel was added 11.3 grams (0.05 moles) of 1-t-butylazo-1-acetoxycyclohexane from the addition funnel over 7 minutes. The temperature slowly rose from 13° C. to 31½° C. The reaction was followed by gas chromatography and after 2 hours the azo was still not completely oxidized. An additional 15 ml. of the peracetic acid solution was added and the reaction stirred an additional 2 hours to complete the oxidation. The reaction mixture was stirred into 200 ml. 10% sodium bicarbonate solution, stirred 5 minutes and the ethyl acetate layer separated. The ethyl acetate solution was rewashed with an additional 200 ml. of 10% NaHCO₃, dried over anhydrous sodium sulfate, filtered and the ethyl acetate evaporated on a rotating evaporator under reduced pressure. The residue was a water white liquid weighing 11.8 grams (97.5% yield). The infrared spectrum of the product had a strong band at 1490 cm$^{-1}$ and 3 bands between 1260 and 1300 cm$^{-1}$ which were not present in the starting azo compound. J. N. Brough, B. Lythgoe and P. Waterhouse (J. Chem. Soc. 1954, 4069) reported the azoxy group absorbs at 1460-1500 and 1280-1320 cm$^{-1}$.

EXAMPLE II 1-t-Butylazoxy-1-methoxycyclohexane

[N-t-butyl-N'-1-(methoxy)cyclohexyldiazine N'-oxide]

1-t-Butylazoxy-1-methoxycyclohexane was prepared in a similar manner by oxidizing 9.9 grams (0.05 m) 1-t-butylazo-1-methoxycyclohexane with 50 ml. of 25% peracetic acid in ethyl acetate at 15° to 44° C. The reaction was followed by gas chromatography and the yield was 9.4 grams (88% yield). The infrared spectrum of the colorless liquid was in agreement with the structure of 1-t-butylazoxy-1-methoxy-cyclohexane (strong band at 1500 cm$^{-1}$)

EXAMPLE III 2-t-Butylazoxy-2-(methoxycarbonyloxy)butane

[N-t-Butyl-N'-(1-methoxycarbonyloxy-1-methylpropyl)diazine N'-oxide]

2-t-Butylazoxy-2-(methoxycarbonyloxy)butane was prepared in a similar manner by oxidizing 10.8 grams (0.05 moles) 2-t-butylazo-2-(methoxycarbonyloxy)butane with 50 ml. of 25% peracetic acid in ethyl acetate at 35° to 40° C. for 3 hours. The reaction was followed by gas chromatography and the yield was 10.4 grams (89.6% yield). The infrared spectrum of the colorless liquid was in agreement with the structure of 2-t-butylazoxy-2-(methoxycarbonyloxy)butane (strong band at 1510 cm$^{-1}$).

EXAMPLE IV 2-t-Butylazoxy-2-phenoxypropane

[N-t-butyl-N'-(1-phenoxy-1-methylethyl)diazine N'-oxide]

2-t-Butylazoxy-2-phenoxypropane was prepared in a similar manner by oxidizing 11.0 grams (0.05 moles) 2-t-butyl-azo-2-phenoxypropane with 50 ml. of 25% peracetic acid in ethyl acetate at 40° C. for 3 hours. The yield was 11.1 grams (94% yield) and the light straw yellow liquid solidifed to a white solid (m.p. 32°–37° C.). The infrared spectrum of the product was in agreement with the structure of 2-t-butylazoxy-2-phenoxypropane (very strong band at 1480–1500 cm$^{-1}$).

EXAMPLE V 2-t-Butylazoxy-2-acetoxypropane

[N-t-butyl-N'-(1-acetoxy-1-methylethyl)diazine N'-oxide]

2-t-Butylazoxy-2-acetoxypropane was prepared by oxidizing 9.3 grams (0.05 moles) 2-t-butylazo-2-acetoxypropane with 60 ml. of 25% peracetic acid in ethyl acetate at 40° C. for 1 hour. The reaction was followed by gas chromatography and the yield was 9.1 grams (90% yield). The infrared spectrum of the colorless liquid was in agreement with the structure of 2-t-butylazoxy-2-acetoxypropane (two very strong bands at 1450–1510 cm$^{-1}$).

EXAMPLE VI 2-t-Butylazoxy-2-methoxypropane

[N-t-butyl-N'-(1-methoxy-1-methylethyl)diazine N'-oxide]

2-t-Butylazoxy-2-methoxypropane was prepared by oxidizing 7.9 grams (0.05 moles) 2-t-butylazo-2-methoxypropane with 50 ml. of 25% peracetic acid in ethyl acetate at 30°–40° C. for 2 hours. The yield was 7.3 grams (84% yield) of a colorless liquid. The infrared spectrum of the product was in agreement with the structure of 2-t-butylazoxy-2-methoxypropane (2 strong bands at 1450–1510 cm$^{-1}$).

EXAMPLE VII 2,2'-Azoxybis(2-acetoxybutane)

[N-(1-acetoxy-1-methylethyl)-N'-(1-acetoxy-1-methylethyl) diazine N'-oxide]

2,2'-Azoxybis(2-acetoxybutane) was prepared by oxidizing 12.9 grams (0.05 moles) of 2,2'-azobis(2-acetoxybutane) with 120 ml. of 25% peracetic acid in ethyl acetate. The reaction was stirred 12 hours at 40°–50° C., allowed to stand overnight and stirred an additional 3 hours at 45°–50° C. before the oxidation was complete. The reaction was followed by gas chromatography and the yield was 11.8 grams (86% yield). The infrared spectrum of the colorless liquid was in agreement with the structure of 2,2'-azoxybis(2-acetoxybutane), (strong band at 1525 cm$^{-1}$).

EXAMPLE VIII 2-t-Butylazoxy-2-cyanopropane

[N-t-butyl-N'-(1-cyano-1-methylethyl)diazine N'-oxide]

2-t-Butylazoxy-2-cyanopropane was prepared by oxidizing 7.7 grams (0.05 moles) of 2-t-butylazo-2-cyanopropane with 50 ml. of 25% peracetic acid in ethyl acetate for 5 hours at 50° C. and then allowed to stand 3 days at room temperature. An additional 25 ml. of the peracetic acid solution was added and the solution allowed to stand another day to complete the oxidation. The reaction was followed by gas chromatography and the crude yield was 8.0 grams (94.6% yield). The gas chromatographic scan indicated there was a small amount of unreacted 2-t-butylazo-2-cyanopropane and an unknown low boiler. The infrared spectrum of the colorless liquid was in agreement with the structure of 2-t-butylazoxy-2-cyanopropane (2 strong bands at 1450–1510 cm$^{-1}$). There were no NH bands in the infrared scan and a strong cyano band at 2250 cm$^{-1}$ indicating the peracetic acid did not attack the cyano band.

EXAMPLE IX 2-t-Butylazoxy-2,4-dimethylpentane

[N-t-butyl-N'-(1,1,3-trimethylbutyl)diazine N'-oxide]

2-t-Butylazoxy-2,4-dimethylpentane was prepared by oxidizing 10.0 grams (0.0545 moles) 2-t-butylazo-2,4-dimethylpentane with 60 ml. of 25% peracetic acid in ethyl acetate at 25°–40° C. for 2 hours. The reaction was followed by gas chromatography and the crude yield was 10.6 grams (97.6% yield). The infrared spectrum of the colorless liquid was in agreement with the structure of 2-t-butylazoxy-2,4-dimethylpentane (strong band at 1495 cm$^{-1}$).

EXAMPLE X 1-t-Butylazoxy-1-phenylcyclohexane

[N-t-butyl-N'-(1-phenylcyclohexyl)diazine N'-oxide]

1-t-Butylazoxy-1-phenylcyclohexane was prepared by oxidizing 8.5 grams (0.0327 moles) of 1-t-butylazo-1-phenylcyclohexane with 60 ml. of 25% peracetic acid in ethyl acetate at 25°–40° C. for 2 hours. The reaction was followed by gas chromatography and the yield was 8.5 grams (98.8% yield). The infrared spectrum of the colorless liquid was in agreement with the structure of 1-t-butylazoxy-1-phenylcyclohexane (strong band at 1490 cm$^{-1}$).

EXAMPLE XI

2-Phenylazoxy-2-acetoxypropane

[N-phenyl-N'-(1-acetoxy-1-methylethyl)diazine N'-oxide]

2-Phenylazo-2-acetoxypropane was prepared in 92% yield by oxidizing 10.0 grams (0.067 moles) acetone phenylhydrazone with 30.6 grams (0.069 moles) lead tetraacetate in 150 ml. methylene chloride.

2-Phenylazoxy-2-acetoxypropane was prepared by oxidizing 10.3 grams (0.05 moles) of the above 2-phenylazo-2-acetoxypropane with 60 ml. of 25% peracetic acid in ethyl acetate at 40°–50° C. for seven hours. The reaction was only 95% complete so it was allowed to stir overnight at room temperature to complete the oxidation. The reaction was followed by gas chromatography and the yield was 8.2 grams (74% yield). The infrared spectrum of the product was in agreement with the structure of 2-phenylazoxy-2-acetoxy propane (strong band at 1495 cm$^{-1}$).

EXAMPLE XII

2-Methylazoxy-2-acetoxybutane

[N-methyl-N'-(1-acetoxy-1-methylpropyl)diazine N'-oxide]

2-Methylazo-2-acetoxybutane was prepared in 99% yield by oxidizing 10.0 grams (0.1 moles) of methyl ethyl ketone methylhydrazone with 53.2 grams (0.12 moles) lead tetraacetate in 150 ml. methylene chloride.

2-Methylazoxy-2-acetoxybutane was prepared by oxidizing 10.0 grams (0.063 moles) of the above 2-methylazo-2-acetoxybutane with 60 ml. of 25% peracetic acid in ethyl acetate at 40°–50° C. for 1½ hours. The reaction was followed by gas chromatography and the yield was 9.4 grams (85.5% yield). The infrared spectrum of the product was in agreement with the structure of 2-methylazoxy-2-acetoxybutane (strong band at 1510 cm$^{-1}$).

EXAMPLE XIII

Preparation of a Standard Polyester-Styrene Resin

The "standard" polyester-styrene resin was prepared by reacting maleic anhydride (1.0 moles), phthalic anhydride (1.0 moles), and propylene glycol (2.2 moles) until an acid number of 45–50 was obtained. To this was added hydroquinone at 0.013% concentration. Seven parts of this unsaturated polyester were diluted with three parts of monomeric styrene to obtain a homogeneous blend having a viscosity of 21 to 25 poise and a specific gravity of 1.14 (The specific gravity of the blend after curing in the absence of a foaming agent was 1.25), obtained by mixing 100 grams of the standard resin with 1 gram of methyl ethyl ketone peroxide, then mixing therewith 0.2 grams of a 6% solution of cobalt naphthenate—gel time of 5.5 minutes, a cure time of 12 minutes and a peak exotherm of 330° F.).

EXAMPLE XIV

Qualitative Method for Evaluating the Azoxy Foaming Agents

The acid sensitive azoxy compounds of Examples I to XII were evaluated as foaming agents in the "Standard Unsaturated Polyester Resin described in Example XIII. The results are found in Table I.

With 100 grams of the Standard Unsaturated Polyester Resin were mixed 0.5 gram t-butyl peroxybenzoate and the desired number of grams of the azoxy compound (see column labeled Parts Azoxy), 1.0 gram Dow Corning 193 surfactant and 0.2 gram of a 10% solution of copper naphthenate in dioctyl phthalate using an electric stirrer. Finally, the appropriate number of grams of an activator (60% sulfuric acid by weight or Lupersol 199P which is acetyl sec.-heptyl-sulfonyl peroxide at 50% concentration in dimethyl phthalate) (see columns labeled Activator and Parts Activator) was mixed into the formulation. The mixture was poured into a waxed cup at ambient temperature (75° F.) and allowed to foam and cure. The cure time was determined by measuring the time required to reach the peak exotherm (see column labeled Cure Time). After the foams had cooled to room temperature the foam density was determined in grams per cubic centimeter (c.c) (see column labeled Foam Density).

TABLE I

| Azoxy Compound | Example # | Activator | Parts Activator | Parts Azoxy | Cure Time (minutes) | Density g/c. c. |
|---|---|---|---|---|---|---|
| 1-t-butylazoxy-1-acetoxy-cyclohexane | I | Lupersol 199P | 2.0 | 1.0 | 20 | 0.50 |
| 1-t-butylazoxy-1-methoxy-cyclohexane | II | Lupersol 199P | 2.0 | 1.0 | 25 | 0.35 |
| 2-t-butylazoxy-2-(methoxy-carbonyloxy)butane | III | 60% $H_2SO_4$ | 0.5 | 1.0 | 10 | 0.50 |
| 2-t-butylazoxy-2-phenoxy-propane | IV | Lupersol 199P | 2.0 | 1.0 | 100 | 0.46 |
| 2-t-butylazoxy-2-acetoxy-propane | V | 60% $H_2SO_4$ | 0.5 | 1.0 | 5 | 0.45 |
| 2-t-butylazoxy-2-methoxy-propane | VI | Lupersol 199P | 2.0 | 1.0 | 25 | 0.30 |
| 2,2-Azoxybis(2-acetoxy-butane) | VII | Lupersol 199P | 4.0 | 1.0 | 45 | 0.38 |
| 2-t-butylazoxy-2-cyano-propane | VIII | Lupersol 199P | 4.0 | 1.0 | 60 | 0.50 |
| 2-t-butylazoxy-2-cyano-propane | VIII | Lupersol 199P | 2.0 | 1.0 | 80 | 0.67 |
| 2-t-butylazoxy-2,4-di-methylpentane | IX | Lupersol 199P | 2.0 | 1.0 | 170 | 0.97 |
| 1-t-butylazoxy-1-phenyl-cyclohexane | X | Lupersol 199P | 2.0 | 1.0 | 150 | 0.65 |
| 2-phenylazoxy-2-acetoxypropane | XI | Lupersol 199P | 4.0 | 1.0 | 60 | 0.46 |
| 2-phenylazoxy-2-acetoxy-propane | XI | Lupersol 199P | 2.0 | 1.0 | 70 | 0.67 |
| 2-methylazoxy-2-acetoxy-butane | XII | Lupersol 199P | 4.0 | 1.0 | 40 | 0.21 |
| 2-methylazoxy-2-acetoxy-butane | XII | Lupersol 199P | 2.0 | 1.0 | 60 | 0.48 |

What is claimed:

1. A compound having the formula

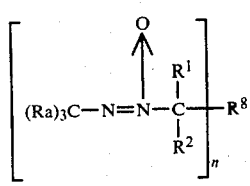

wherein
(a) n is 1 or 2
(b) $R^1$ is selected from alkyl of 1 to 6 carbons or cycloalkyl of 3 to 12 carbons;
(c) $R^2$ is selected from $R^1$ and aryl of 6 to 10 carbons;
(d) $R^1$ and $R^2$ when joined together to form an alkylene of 3 to 11 carbons;
(e) $(R_a)_3 C-$ is selected from tertiary-alkyl of 4 to 8 carbons, tertiary cycloalkyl of 6 to 11 carbons or tertiary aralkyl of 9 to 12 carbons;
(f) when n is 1, $R^8$ is selected from

—CN, —OAc, or —$OR^4$ where $R^4$ is methyl, ethyl, propyl, isopropyl, or phenyl;
(g) when n is 2, $R^8$ is selected from —O—, $$-OCR^7CO-, \quad -OCOR^7OCO-, \quad -O-\overset{O}{\underset{\|}{C}}-R^7-, \text{ or}$$
$$-O-\overset{O}{\underset{\|}{C}}-O-R^7-;$$

(h) $R^7$ is a divalent radical selected from alkylene of 1 to 10 carbons, cycloalkylene of 3 to 6 carbons or phenylene.

2. The compound of claim 1 is 1-t-butylazoxy-1-acetoxycyclohexane.
3. The compound of claim 1 is 2-t-butylazoxy-2-(methoxycarbonyloxy)butane.
4. The compound of claim 1 is 2-t-butylazoxy-2-phenoxypropane.

* * * * *